United States Patent
Rulli et al.

(10) Patent No.: US 10,902,455 B2
(45) Date of Patent: *Jan. 26, 2021

(54) SYSTEM AND METHOD FOR REMUNERATION IN EXCHANGE FOR PARTICIPATION IN QUALIFYING EVENTS

(71) Applicants: Francesco Rulli, New York, NY (US); Maurizio Ranaboldo, Lukang Town (TW)

(72) Inventors: Francesco Rulli, New York, NY (US); Maurizio Ranaboldo, Lukang Town (TW)

(*) Notice: Subject to any disclaimer, the term of this patent is extended or adjusted under 35 U.S.C. 154(b) by 0 days.

This patent is subject to a terminal disclaimer.

(21) Appl. No.: 16/411,758

(22) Filed: May 14, 2019

(65) Prior Publication Data
US 2020/0134661 A1    Apr. 30, 2020

Related U.S. Application Data

(63) Continuation of application No. 15/171,590, filed on Jun. 2, 2016, now Pat. No. 10,304,078.

(51) Int. Cl.
*G06Q 30/00* (2012.01)
*G06Q 30/02* (2012.01)
*H04L 29/06* (2006.01)

(52) U.S. Cl.
CPC ..... *G06Q 30/0239* (2013.01); *G06Q 30/0209* (2013.01); *G06Q 30/0217* (2013.01); *G06Q 30/0277* (2013.01); *H04L 63/08* (2013.01); *H04L 63/0807* (2013.01); *H04L 2463/102* (2013.01)

(58) Field of Classification Search
CPC ........... G06Q 30/0239; G06Q 30/0217; G06Q 30/0209; G06Q 30/0277; H04L 63/08; H04L 63/0807; H04L 2463/102
See application file for complete search history.

(56) References Cited

U.S. PATENT DOCUMENTS

9,424,575 B2 *   8/2016   Grigg ................. G06Q 20/4016
10,380,585 B2 *  8/2019   Harris ................ G06Q 20/3821
(Continued)

OTHER PUBLICATIONS

Mayer, et al. "Third-Party Web Tracking: Policy and Technology." 2012 IEEE Symposium on Security and Privacy, 2012. (Year: 2012).*

(Continued)

*Primary Examiner* — Luis A Brown
(74) *Attorney, Agent, or Firm* — Sofer & Haroun, LLP

(57) ABSTRACT

The present system provides a user remuneration in exchange for participation in a qualifying event. The system has an internet interface for interacting with a plurality of users and a plurality of advertisers, an account database; and a token generation module. The token generation module is configured such that when a user encounters a qualifying event on the internet as presented by the advertiser, the token generation module, upon login by the user, delivers an authentication token to the advertiser. When the user finishes the qualifying event, the authentication token is authenticated by the advertiser and returned to the system, such that the system can account for a remuneration for the user to be credited in an account associated with the user in the account database.

8 Claims, 5 Drawing Sheets

(56) References Cited

U.S. PATENT DOCUMENTS

| | | | | |
|---|---|---|---|---|
| 2002/0133467 A1* | 9/2002 | Hobson | G06Q 20/04 | 705/64 |
| 2004/0122736 A1* | 6/2004 | Strock | G06Q 30/0231 | 705/14.31 |
| 2011/0010238 A1* | 1/2011 | Postrel | G06Q 30/0229 | 705/14.38 |
| 2011/0060629 A1* | 3/2011 | Yoder | G06Q 20/10 | 705/14.1 |
| 2011/0208656 A1* | 8/2011 | Alba | G06Q 20/36 | 705/65 |
| 2013/0132184 A1* | 5/2013 | Mutha | G06Q 30/06 | 705/14.27 |
| 2014/0243072 A1* | 8/2014 | Santini | G07F 17/3255 | 463/20 |
| 2015/0032625 A1* | 1/2015 | Dill | H04L 9/32 | 705/44 |
| 2015/0127547 A1* | 5/2015 | Powell | G06Q 20/385 | 705/67 |
| 2015/0161642 A1* | 6/2015 | Pastore | G06Q 30/0224 | 705/14.25 |
| 2015/0186871 A1* | 7/2015 | Laracey | G06Q 20/3278 | 705/41 |
| 2015/0254638 A1* | 9/2015 | Bondesen | G06Q 20/3674 | 705/41 |
| 2015/0254695 A1* | 9/2015 | Howard | G06Q 30/0269 | 705/14.12 |
| 2015/0332264 A1* | 11/2015 | Bondesen | G06Q 20/385 | 705/44 |
| 2016/0019533 A1* | 1/2016 | Wu | G06O 20/3278 | 705/67 |
| 2016/0071094 A1* | 3/2016 | Krishnaiah | G06Q 20/3672 | 705/66 |
| 2016/0203475 A1* | 7/2016 | Venugopalan | G06Q 20/3672 | 705/66 |
| 2016/0239833 A1* | 8/2016 | Venugopalan | G06Q 20/20 | |
| 2016/0283942 A1* | 9/2016 | Chitragar | G06Q 20/327 | |
| 2016/0358163 A1* | 12/2016 | Kumar | G06Q 20/02 | |
| 2017/0195879 A1* | 7/2017 | Jones-McFadden | G06Q 20/425 | |
| 2017/0270557 A1* | 9/2017 | Maenpaa | G06Q 20/327 | |

OTHER PUBLICATIONS

Li, Ming et al. "LocaWard: A Security and Privacy Aware Location-Based Rewarding System." IEEE Transactions on Parallel and Distributed Systems, vol. 25, No. 2, Feb. 2014. (Year: 2014).*

* cited by examiner

SYSTEM AND METHOD FOR REMUNERATION IN EXCHANGE FOR PARTICIPATION IN QUALIFYING EVENTS

RELATED APPLICATION

This application is a continuation of U.S. patent Publication Ser. No. 15/171,590, filed on Jun. 2, 2016, which in turn claims priority to U.S. Provisional Patent Application No. 62/169,866, filed on Jun. 2, 2015, the entirety of which are incorporated by reference.

FIELD OF THE INVENTION

The present arrangement is directed to a system and method for the exchange of funds and/or remunerative distributions (e.g. coupons). More particularly, the present arrangement is directed to a system and method for the transfer of funds and/or remunerative distributions to a user in exchange for engaging in a participating event.

DESCRIPTION OF RELATED ART

In the area of advertising, particularly on-line advertisements such as banner advertisements, pop-up advertisements, video advertisements, email distribution advertisements, etc. . . . , maintaining the attention of the user is considered critical. Often advertisements are skipped, passed over, or otherwise overlooked. This is particularly true in the on-line environment where, unlike traditional television, the audience is not captive and is easily able to either avoid viewing the advertisement or can move to another screen quickly.

OBJECTS AND SUMMARY

The present arrangement provides a system and method for delivering funds and/or remunerative distributions (e.g. coupons) to a user which in this application is referring to an on-line user that is observing one or more advertisements.

In this respect, the user generates a single remuneration account including an electronic deposit account, possibly denominated in bitcoin or other electronic currency, where a user can collect rewards or otherwise be paid for various advertising views on different applications or websites. The system entails a common account that can be utilized by many different applications and websites, but from the user's side only requires maintaining a single account.

Moreover, the method of delivering remuneration and/or funds to the account is able to utilize a token/authorization model, where the system generates a unique user identifying token for each transaction with an advertiser so that when the user has completed the required task with the advertiser the system can receive the token along with a remuneration or given funds amount. This allows the system to properly credit the user's account in an authenticated manner. Such a system may moreover be employed to allow many different advertisers to submit payments to users/viewers in an authenticated manner without the system ever disclosing the account information of the user to the advertiser.

BRIEF DESCRIPTION OF THE DRAWINGS

The present invention can be best understood through the following description and accompanying drawings, wherein.

DETAILED DESCRIPTION

Figure 1:
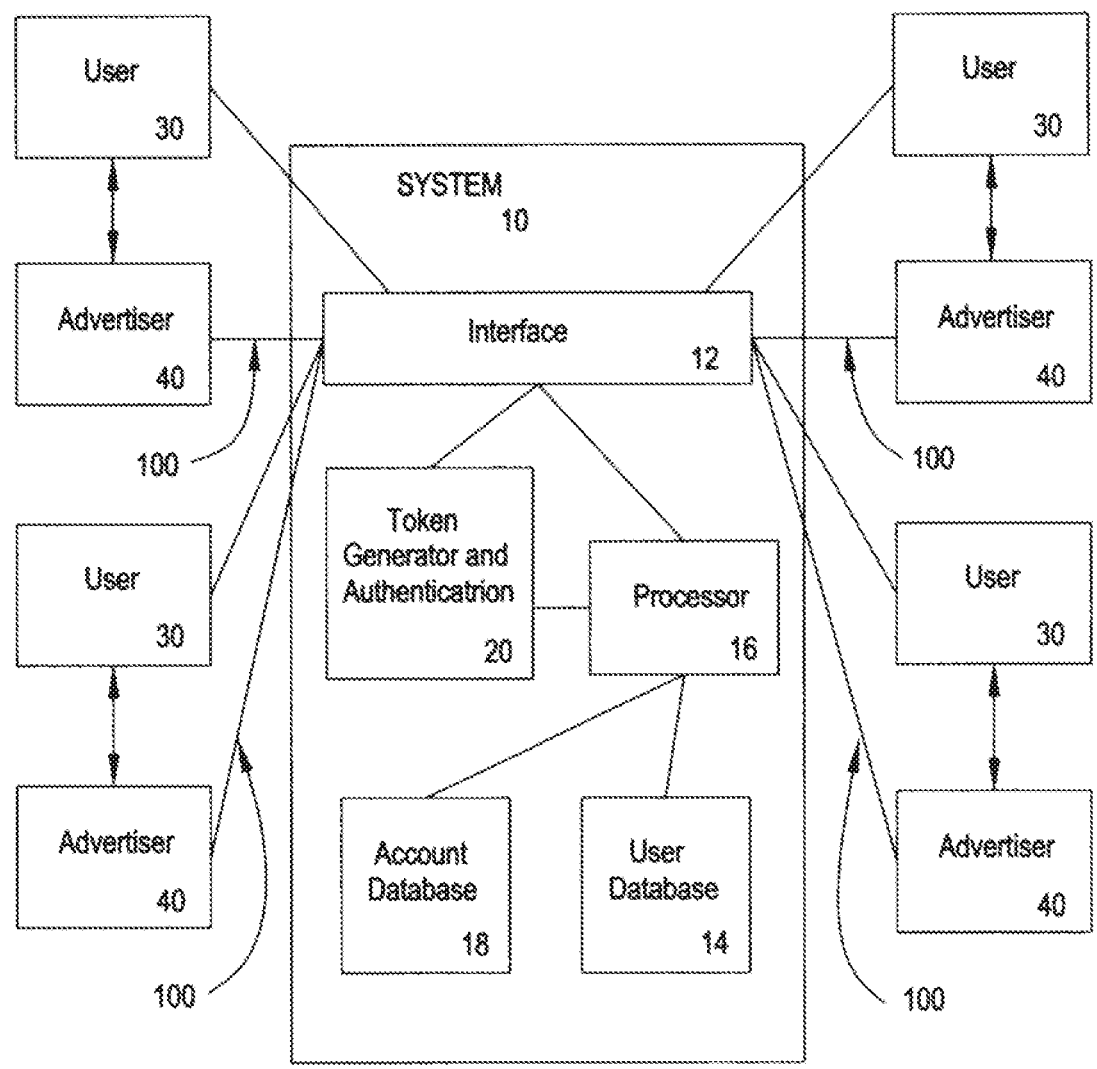
FIG. 1 is a block diagram of the present system in accordance with one embodiment.

The present example shown in FIG. 1 provides an exemplary system 10 for implementing the features of the present invention. As shown in FIG. 1, system 10 employs in some capacity an interface 12, a user database 14, a processor 16, an account database 18 (for storing user remuneration coupled with a user account) and a token generation/authentication module 20. As illustrated below and in the examples, users 30 and advertisers 40 interact with one another via system 10.

It is noted that nothing in FIG. 1 is considered to be limiting. Additional components may be added as necessary to support the functions of system 10. For the purpose of this application "advertiser" 40 simply refers to any entity which wishes for users 30 to view their website or otherwise engage in an activity (such as a questionnaire) which among other aspects is to raise awareness of the entity.

As explained below, system 10 generates and uses tokens 100 which are provided to advertiser 40 that identify user 30 within system 10. Token 100 is an encoded digital identifier, each of which is unique, and also each uniquely identifying a particular user 30 of system 10. After the requirements of advertiser 40 are met by a particular user 30 visiting a web advertisement, survey or other such material at advertiser's web site or an advertisement managed/produced/and-or distributed by advertiser 40 (e.g. user 30 views advertisement), advertiser 40 can return a token 100 to system 10 along with a remuneration amount and system 10 can credit an account of user 30 accordingly.

Figure 2:
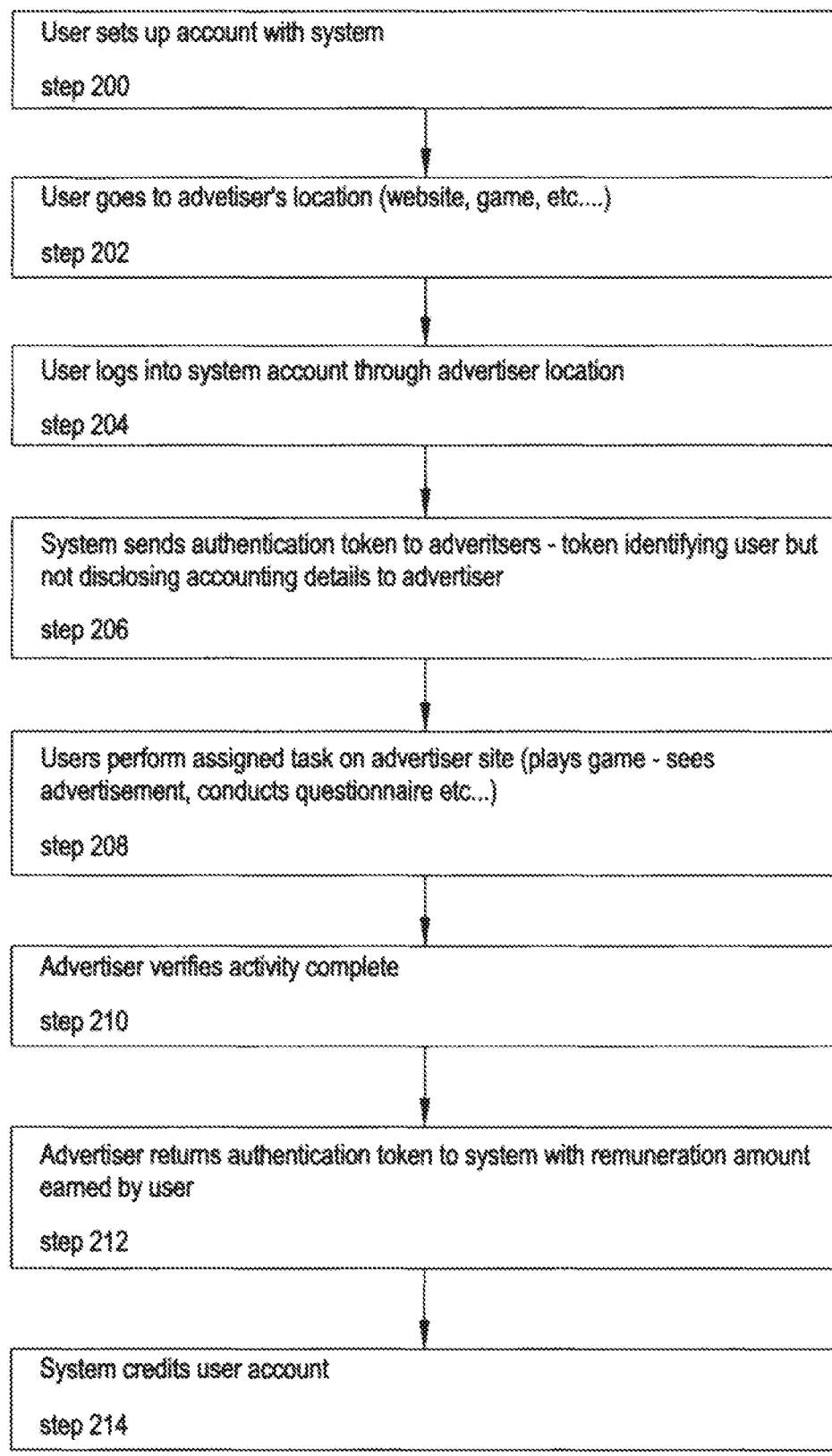
FIG. 2 is a flow chart of the operation of the token system in accordance with one embodiment.

For example, as shown in FIG. 2, a user 30 can set up account at system 10 at step 200 and visit a website of an advertiser 40 at step 202, also working with system 10. At this site user 30 can be offered a reward (e.g. coupons, money or other remuneration) for viewing advertisements or answering a questionnaire etc. When at the site, at step 204 user 30 logs into system 10 and token generation and authentication module 20 generates a unique token 100 at step 206, identifying user 30 and possibly other information including advertiser 40, the time of creation, a duration of validity of token 10 and other validation information. This unique token is delivered to advertiser 40 for storage while user 30 engages in the requested activity.

At step 208, once user 30 has completed the reward activity and advertiser 40 authenticates this at step 210, token 100 is returned to system 10 at step 212. At step 214, token 100 is processed by token authentication module 20 along with a remuneration amount and system 10 credits the appropriate user account in user database 14 and debits the appropriate advertiser account in account database 18.

This token process is repeated every time any user 30 logs in with an advertiser 40 with a new and unique token 100 each time. The same process may be used for all advertisers 40 associated with system 10 allowing a user 30 to use one single account with system 10 to receive rewards in a central location rather than with each of the advertisers independently.

Figure 3:
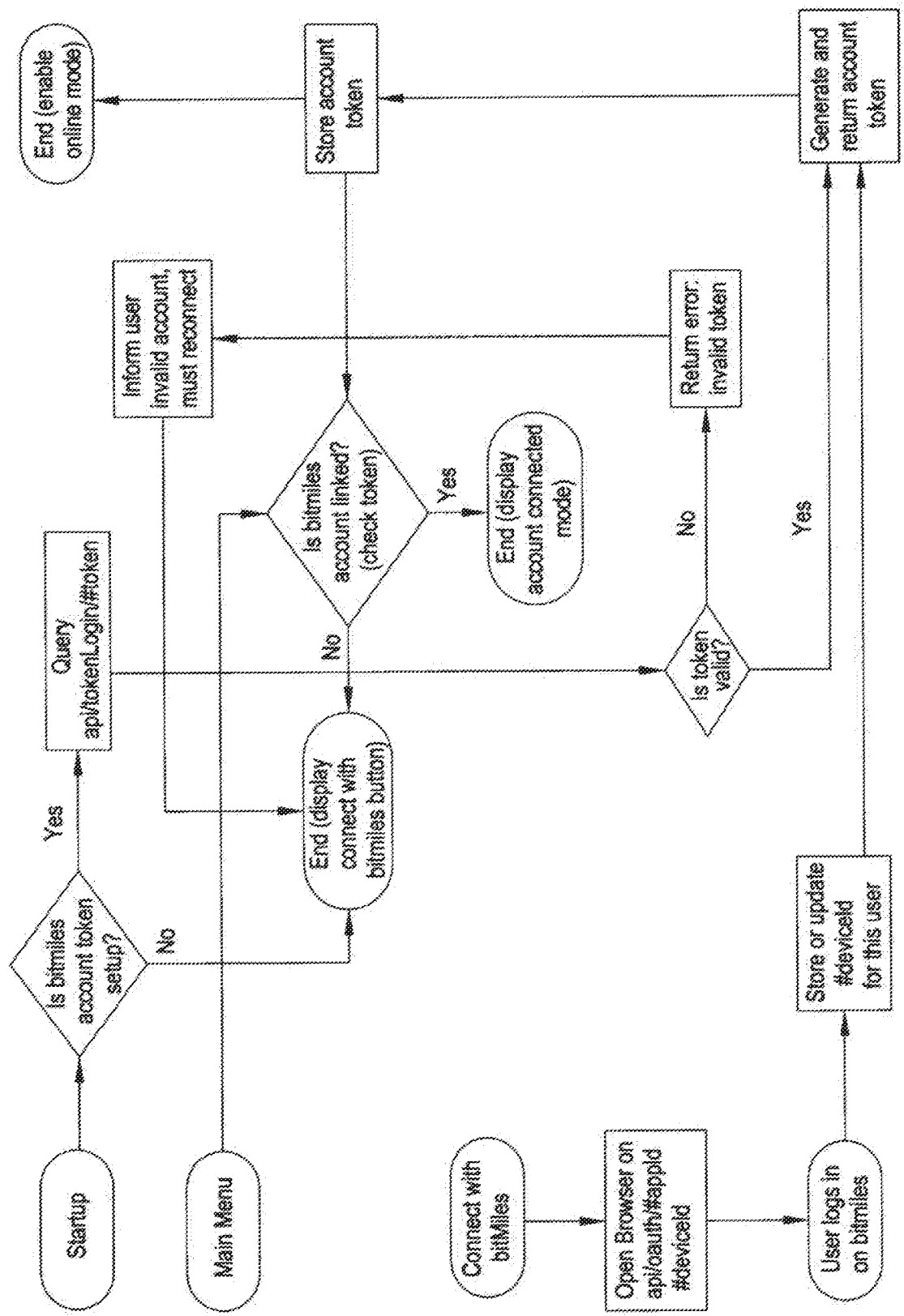
FIG. 3 is an exemplary flow diagram illustrating the location of certain steps, in accordance with one embodiment.

FIG. 3 is an exemplary flow chart that elaborates on the steps outlined above in FIG. 2, explaining the interactions at both system 10 and the advertiser 40 and their relationship with one another.

In summary, a user 30 may generate an account with system 10 and then view an advertisement managed by advertiser 40, such as at their website. At the advertisement, user 30 logs into their system account and system 10 generates and delivers a user identifying token 100 to advertiser 40. This token 100 is simply an authentication code that will later allow system 10 to account for the remuneration of user 30. Once token 100 is received by advertiser 40, user 30 then proceeds to the advertiser's desired activity. Such activity could be filling out a questionnaire, viewing an advertisement during a game etc..... Regardless of what is done, advertiser 40 tracks the completion of the task and returns token 100 to system 10 with a given compensation to be accounted to user 30. System 10 receives token 100, authenticates its validity and then applies the amount of remuneration to the user's account linked with the returned token 100. Thereafter system 10 may bill advertiser 40 or otherwise perform the required accounting.

Such a system as described herein allows external services (advertisers 40), programs, websites, mobile apps and in general any device that can run on a regular web browser, to connect to the user accounts of system 10 to request rewards for actions completed on such external platforms.

System 10 may use the "OAuth" authentication protocol to allow users 30 to create system accounts or to use their existing accounts to allow the application/advertiser 40 to use their information and request rewards on their behalf. One advantage of using OAuth authentication is to allow users to grant permissions to request rewards on their behalf to the application/advertiser 40, without disclosing their system credentials to the application/advertiser 40 itself.

When the "OAuth" login process is completed, application/advertiser 40 possesses a token 100 which uniquely identifies user 30 for this application and can be used for further communication with system 10 on behalf of this user 30. An external application 40 may be registered on system 10 to be authorized to request rewards. That application 40 may own a pre-paid budget on the owner's account on system 10 which is used to reward users 30.

In some situations there are two kinds of advertiser/applications 40: trusted and not-trusted. A trusted application 40 is an advertiser application 40 that cannot be tampered with and is not subject to a man in the middle style of attack, such as a webserver hosting a website. When a trusted application 40 requests a reward on behalf of their own user 30, the trusted application 40 has the duty of deciding whether it really wishes to reward user 30 for the action taken.

Figure 4:
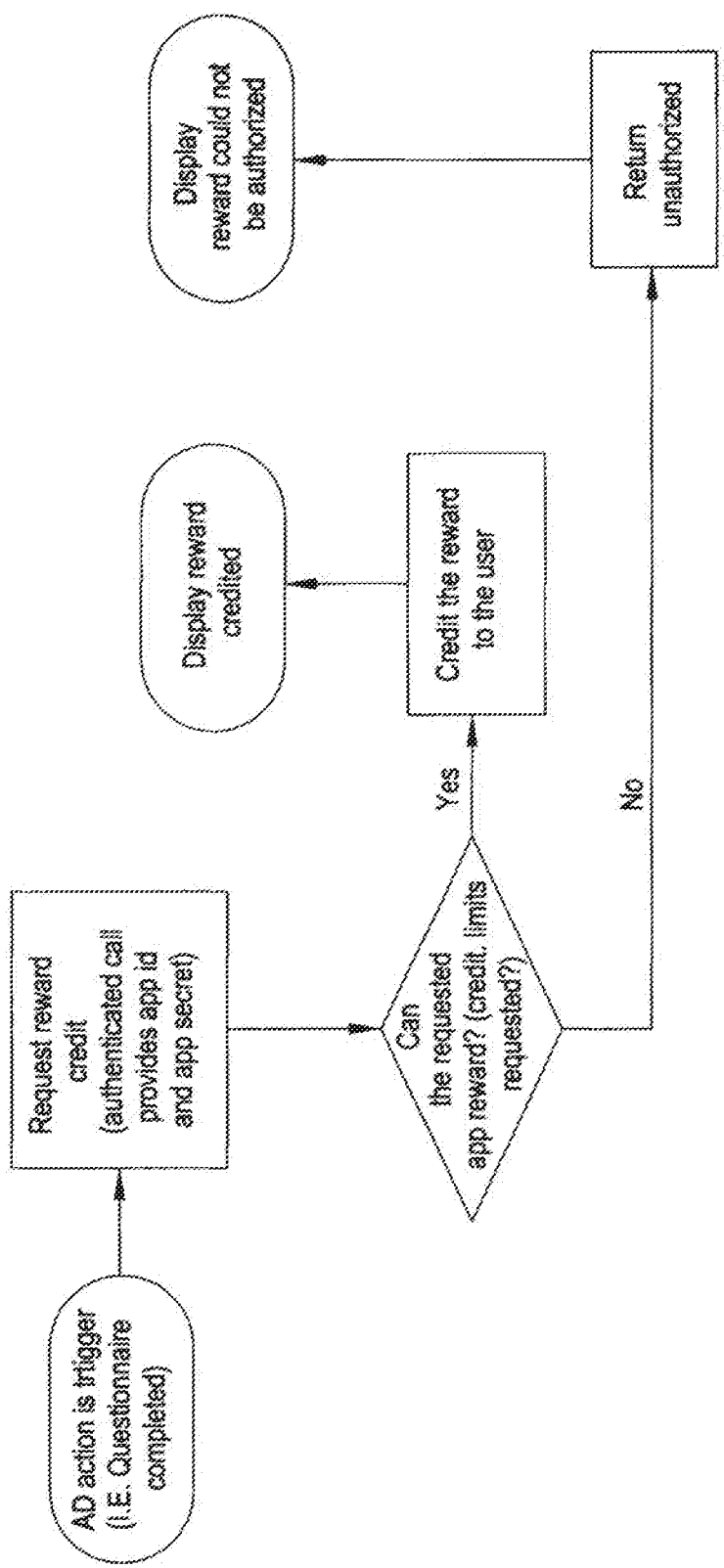
FIG. 4 is an exemplary flow diagram illustrating the location of certain steps, in accordance with one embodiment.

For example: if an advertiser/website 40 wants to reward a user 30 for filling out a questionnaire, it can analyze the data submitted by user 30 and ensure it is complete and thorough. After deciding the reward is due, the trusted application 40 establishes a server-to-server connection to system 10 and requests a reward for user 30 who completed the questionnaire by sending their token 100 and the amount requested. The system only checks the advertiser/application for credit and credit limits and sends the reward to user 30. See for example FIG. 4 for an outline of this transaction and the relationship between such trusted advertisers 40 and system 10.

Figure 5:
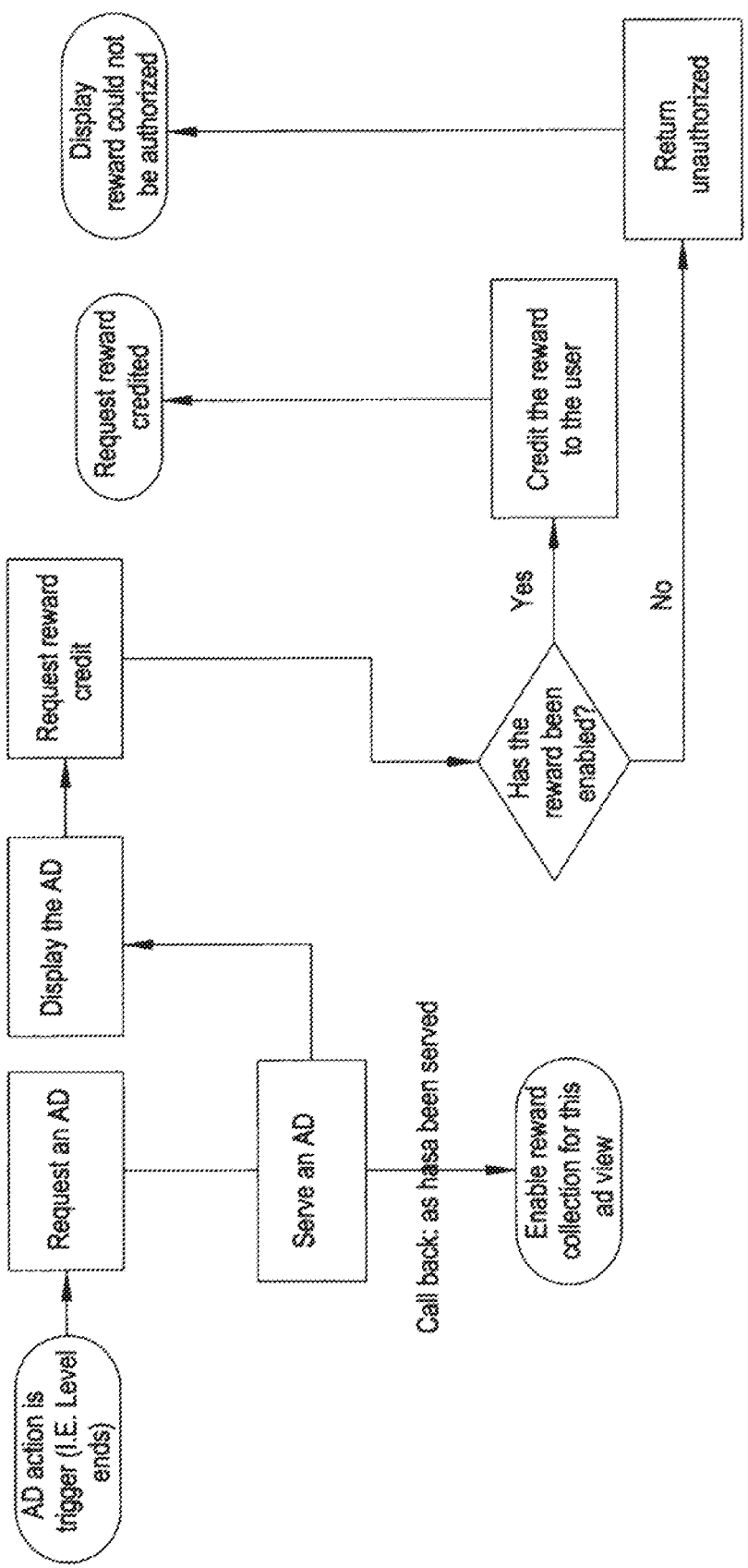
FIG. 5 is an exemplary flow diagram illustrating the location of certain steps, in accordance with one embodiment.

In another embodiment, advertiser/applications 40 subject to MITM attacks are considered untrusted. Therefore, their rewards should be authorized by a server. In the example below in FIG. 5 system 10 works with an advertiser/application that can display advertisements and an advertisement server 50 which can direct a callback to a rewards API of system 10 to confirm the ad has been served. The function of third party advertisement server 50 can be fulfilled by any other service which takes charge of authorizing the rewards with best effort algorithms.

For example: a game advertiser application 40 may request rewards on average every 15 to 20 seconds. Every time a reward is requested, the progress of user 30 is sent along with the request and a server-side service at server 50 that keeps track of it. If a reward is requested too often or the progress is not compatible with the progress of user 30 (skipped levels, high level right after a death, and similar) then the reward is not authorized. This discourages cheating and botting because the results would be just about the same as the ones achievable by not botting at all. This kind of advertiser/application 40 should also set daily limits to gainable rewards, as should all advertiser/applications 40 that try to monetize the rewards API by showing ads and sharing the advertisement revenue, because of limited advertisement inventory and limits on per-user advertisement views.

Although the above examples show system 10 being used for "advertisers" 40 it is contemplated that system 10 can be used by any entity looking to distribute funds or otherwise attract funds for donations etc. . . . . . For example an entity 40 that is an advertiser may wish to donate funds to a charity/awareness campaign but simultaneously raise awareness of the donation campaign as a form of advertising. In the prior art, the advertiser/donator would set aside some funds to donate (possibly matching funds to match against donations from the public) but a portion would be used to advertise the donation event so that the public would be aware of the donation campaign. Using the present system 10, users 30 of system 10 may be notified of a campaign of advertiser/donator 40 and may be prompted to participate in a questionnaire or review of a short advertisement about the donation. Using the present system 10, user 30 would log in and a token 100 would be issued to advertiser 40 and after user 30 performs the desired task advertiser 30 would return token 100 to system 10 which would acknowledge to user 30 that the donation has been made on their behalf in exchange for viewing the awareness campaign.

Such an arrangement reduces the need for the advertiser/donator 40 to promote the campaign and it incentivizes users 30 to directly engage in the awareness campaign as they see their donation as a direct feedback to viewing a video or whatever else the advertiser/donator requests.

Such an arrangement as described above:
1) improves the conversion rate of advertiser 40 campaigns (ADs, remarketing and more), resulting in an overall cheaper marketing strategy by rewarding users 30 part of the budget which would otherwise be given to the ad company providing the click;
2) improves usage rates of mobile apps by rewarding users 30 with a fraction of the advertisement revenue of the advertiser/application 40 itself collected from various different sources; and
3) provides users 30 with a centralized wallet where they can receive all their rewards from third party apps 40 and ways to retrieve them in the form of bitcoin, paypal credit, coupons, donations to popular charities and more.

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

Such a system may moreover be employed to allow many different advertisers to submit payments to users/viewers in an authenticated manner without the system ever disclosing the account information of the user to the advertiser.

What is claimed is:

1. A system for providing users/viewers of a qualifying event remuneration by participation in a qualifying event, said system comprising:
    an internet interface for interacting with a plurality of users/viewers of a qualifying event and a plurality of third party advertisers;
    an account database; and
    a token generation module that generates an authentication token that is delivered to a third party advertiser after a user/viewer logs into said system and encounters said qualifying event presented by said third party advertiser,
    wherein after said user/viewer completes said qualifying event, said third party delivers an authenticated said authentication token to said system, and
    wherein said system subsequently remunerates said user/viewer in an account associated with said user/viewer in said account database, said third party advertiser compensating said system for said remuneration.

2. The system as claimed in claim 1, wherein said qualifying event is a game.

3. The system as claimed in claim 1, wherein said qualifying event is an advertisement.

4. The system as claimed in claim 1, wherein said qualifying event is a questionnaire.

5. The system as claimed in claim 1, wherein said authentication token uses "OAuth" authentication protocol.

6. The system as claimed in claim 1, wherein said authentication token is passed through a third party secure server for authentication when said third party advertiser uses unsecured connections.

7. The system as claimed in claim 1, wherein said remuneration is provided in any one of, or combinations thereof, of bitcoin, money, coupons or electronic funds credit.

8. The system as claimed in claim 1, wherein said system is configured to allow said plurality of third party advertisers to provide remuneration to any one of said users/viewers, to be accounted for by said system, in an authenticated manner, without said system disclosing any account information of said users to any of said plurality of third party advertisers.

* * * * *